Patented July 17, 1923.

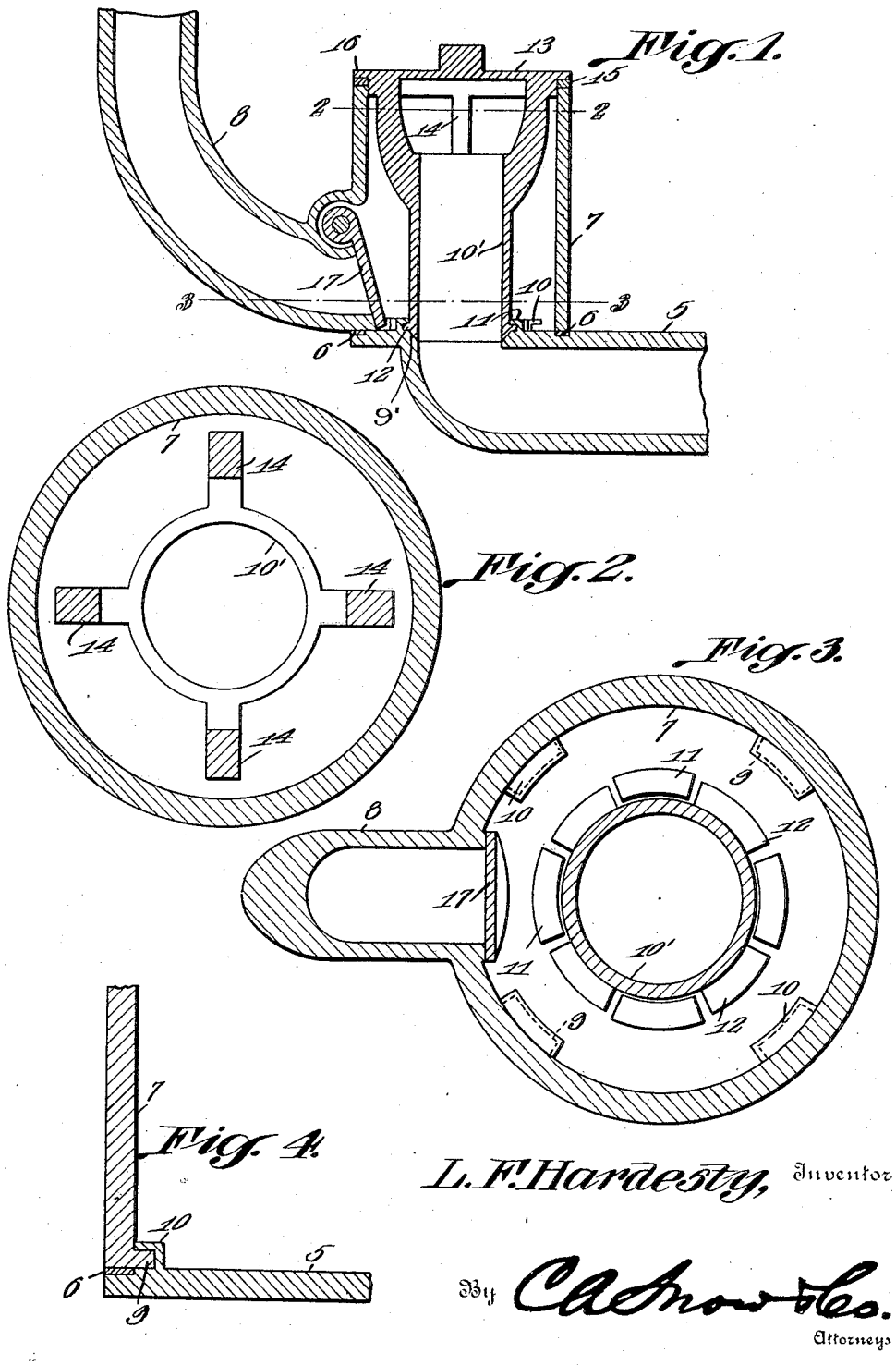

1,462,007

UNITED STATES PATENT OFFICE.

LESLIE FOREST HARDESTY, OF TERRA ALTA, WEST VIRGINIA.

TRAP.

Application filed March 24, 1923. Serial No. 627,494.

*To all whom it may concern:*

Be it known that I, LESLIE F. HARDESTY, a citizen of the United States, residing at Terra Alta, in the county of Preston and State of West Virginia, have invented a new and useful Trap, of which the following is a specification.

This invention relates to trap constructions, and more particularly to a trap construction which may be readily and easily cleaned by persons unfamiliar with plumbing, thereby insuring against clogging of the system of which the trap forms a part.

Another object of the invention is to provide a trap having a removable outlet pipe whereby the outlet pipe may be moved within its housing to prevent freezing of the fluid therein.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a sectional view through a trap constructed in accordance with the invention.

Figure 2 is a sectional view taken on line 2—2 of Figure 1.

Figure 3 is a sectional view taken on line 3—3 of Figure 1.

Figure 4 is a sectional detail view disclosing the connection between the trap housing and pipe supporting the same.

Referring to the drawing in detail, the reference character 5 designates an outlet pipe of a sewage system, which outlet pipe is provided with a groove to accommodate the packing ring 6, on which the housing 7 rests, the packing acting to provide a fluid-tight connection between the pipe 5 and housing 7.

An inlet pipe is indicated at 8, through which pipe fluid enters the trap housing 7 and passes to the outlet pipe 5.

Lugs indicated at 10 are secured to the upper surface of the pipe 5 at points adjacent to the inner wall of the housing 7, which lugs cooperate with lugs 9 formed on the housing 7 so that when the lugs are brought into contact with each other, the housing together with the pipe 8 will be securely held to the pipe 5.

As shown, the opening of the pipe 5 is formed with a tapered wall 9' providing a seat for the tapered extremity of the outlet pipe 10', which, as shown, is removable. Lugs 11 are carried by the pipe 5 at a point adjacent to the wall 9' and cooperate with the laterally extending lugs 12 formed on the pipe 10' to cause the pipe 10' to be moved into close engagement with pipe 5. The arms 14 extend outwardly and upwardly from the upper extremity of the pipe 10', and support the cover 13 which is formed integral at the upper ends of the arm 14, the spaces between the arms 14 forming passageways to allow fluid to pass into the pipe 10' and into the pipe 5. In order that a fluid-tight connection will be had between the housing 7 and cover 13, the packing ring 15 is mounted on the upper end of the housing 7 and is engaged by the flange 16 of the cover 13, so that when the cover 13 is rotated to position the pipe 10' pressure will be exerted on the packing ring 15.

Positioned within the housing 7 is a check valve indicated at 17, which check valve may operate to admit fluid to the pipe 10', but close the discharge end of the pipe 8 and prevent gas collecting in the housing 7 from passing into pipe 8.

From the foregoing it will be seen that should the trap become clogged, the cover 13 may be readily operated to unseat the pipe 10' and allow any material collected in the housing, to pass into the pipe 5.

What is claimed as new is:—

1. In a trap, a pipe having an opening formed with a tapered wall, lugs forming a part of the pipe and disposed adjacent to the tapered wall, a removable housing supported on the pipe, means for securing the housing to the pipe, a removable pipe within the housing, and a cover formed integral with the pipe to move therewith.

2. In a trap, a pipe having an opening formed with a tapered wall, a housing removably supported on the pipe, a removable pipe disposed within the housing and having a tapered end positioned in the opening of the first mentioned pipe, upwardly extended arms forming a part of the last mentioned pipe, a cover formed integral with the arms and adapted to close the upper end of the housing, and said cover adapted to be moved to secure the last mentioned pipe to the first mentioned pipe.

3. In a trap, a pipe, a housing removably secured to the pipe and communicating therewith, an inlet pipe forming a part of the housing, a removable outlet pipe positioned within the housing, means for securing the removable outlet pipe in position, upwardly extending arms on the removable outlet pipe, a cover formed integral with the arm, the spaces between the arms providing openings to admit fluid to the removable outlet pipe, and a check valve operating between the removable outlet pipe and inlet pipe.

In testimony that I claim the foregoing as my own, I have hereto affixed my signature in the presence of two witnesses.

LESLIE FOREST HARDESTY.

Witnesses:
W. F. DAILEY,
HARRY H. IDLEMAN.